US007151255B2

(12) United States Patent
Weiss et al.

(10) Patent No.: US 7,151,255 B2
(45) **Date of Patent: *Dec. 19, 2006**

(54) TRAVELLING FIELD FOR PACKAGING ION BEAMS

(75) Inventors: Gerhard Weiss, Weyhe (DE); Jochen Franzen, Bremen (DE)

(73) Assignee: Bruker Daltonik GmbH, Bremen (DE)

( * ) Notice: Subject to any disclaimer, the term of this patent is extended or adjusted under 35 U.S.C. 154(b) by 42 days.

This patent is subject to a terminal disclaimer.

(21) Appl. No.: 10/779,333

(22) Filed: Feb. 16, 2004

(65) Prior Publication Data

US 2005/0109933 A1 May 26, 2005

Related U.S. Application Data

(63) Continuation of application No. 10/080,520, filed on Feb. 22, 2002, now Pat. No. 6,693,276.

(30) Foreign Application Priority Data

Feb. 22, 2001 (DE) ................................ 101 08 454

(51) Int. Cl.
*H01J 49/26* (2006.01)
*B01D 59/44* (2006.01)

(52) U.S. Cl. ...................... 250/290; 250/292; 250/288; 250/423 R; 315/5.41

(58) Field of Classification Search ................ 250/290, 250/292, 288, 424, 423 R; 313/360.1; 315/5.41
See application file for complete search history.

(56) References Cited

U.S. PATENT DOCUMENTS

| | | | | |
|---|---|---|---|---|
| 5,572,035 | A | 11/1996 | Franzen | |
| 5,818,055 | A * | 10/1998 | Franzen | 250/292 |
| 6,011,259 | A | 1/2000 | Whitehouse et al. | |
| 6,693,276 | B1 * | 2/2004 | Weiss et al. | 250/288 |
| 6,717,132 | B1 | 4/2004 | Franzen | |
| 6,794,641 | B1 * | 9/2004 | Bateman et al. | 250/281 |

* cited by examiner

*Primary Examiner*—Nikita Wells
(74) *Attorney, Agent, or Firm*—Ward & Olivo

(57) ABSTRACT

The invention relates to a device and a method for producing, from any previously configured ion beams, precisely localized small packages of ions which all fly at the same velocity. The invention consists of damping the ions in a damping-gas filled series of apertured diaphragms (which are firstly subjected alternately to the two phases of an RF voltage and secondly to a multiphase low-frequency travelling field voltage) into the axis of the apertured diaphragm arrangement and packaging the ions in bundles which are propelled axially at the same velocity for ions of different specific masses. These ion packages, which are restricted both in an axial and a radial direction, can be used to advantage for injection into different types of mass spectrometer, both storage ion-trap mass spectrometers, such as cyclotron resonance mass spectrometers or quadrupole ion traps and, especially, for time-of-flight mass spectrometers with orthogonal injection. The arrangement of a damping-gas filled series of apertured diaphragms can also be used for ion fragmentation.

19 Claims, 2 Drawing Sheets

TRAVELLING FIELD FOR PACKAGING ION BEAMS

CROSS-REFERENCE TO RELATED PATENTS

This application is a continuation of application Ser. No. 10/080,520, filed on Feb. 22, 2002, now U.S. Pat. No. 6,693,276.

FIELD OF THE INVENTION

The invention relates to a device and a method for producing, from any previously configured ion beams, precisely localized small packages of ions which all fly at the same velocity.

BACKGROUND OF THE INVENTION

The use of mass spectrometric methods in biochemistry, particularly in genetic and protein research, is still limited by the fact that a large amount of substance is consumed when using these methods. Lower substance consumption is also demanded for other applications. In order to obtain a mass spectrometric reading from a few attomols of a substance (1 attomol=600,000 molecules), substance ionization must be maximized and ion losses must be reduced to a minimum during every stage from ion generation up to the actual measurement. The yield must be optimized at each step.

In this regard, a particularly crucial step is how the ions are injected into the mass spectrometer being used since with the different types of mass spectrometer, such as the ion-trap or time-of-flight mass spectrometer with orthogonal injection this still cannot be achieved with losses near to zero.

The production of ions for mass spectrometric analysis inside a vacuum system has the disadvantage of requiring a large excess of the substance molecules to be introduced into the vacuum system. On the one hand, there is the risk of contaminating the ion source due to the molecules of the substance condensing on the walls, thus giving the surfaces a charge and impairing operation. On the other hand, the ion yield from the ionizing processes inside the vacuum is very low. For this reason, ions are now being produced more and more outside the vacuum system of the mass spectrometer and then transferred to the mass spectrometer by using suitable methods.

Among the ion sources external to the vacuum which are available are, for example, Electrospray Ionization (ESI), in which substances with exceptionally high molecular weights can be ionized with very high yields. The electrospray ionization is frequently coupled with modern separation methods such as liquid chromatography or capillary electrophoresis. This group of ion sources external to the vacuum also includes methods using Inductively Coupled Plasma (ICP) ionization, which is used in inorganic analysis. Finally, there is Atmospheric Pressure Chemical Ionization (APCI) utilizing primary ionization of the reactant gases by corona discharge or beta emitter with electrons emitted at low energy. APCI is also used for the analysis of air pollutants and is particularly suitable for coupling to mass spectrometry via gas chromatography, liquid chromatography and capillary electrophoresis. Other types of ion sources external to the vacuum, such as Grimm hollow cathode discharge or matrix assisted desorption to air, are still being examined and developed.

The practice so far has been to release the ions from these sources along with large quantities of environmental gas into the vacuum of the ion-trap mass spectrometer. Fine apertures of approx. 30 to 300 μm diameter or 10 to 20 cm long capillaries of approx. 500 μm internal diameter are used for this purpose. The excess gas must be removed by means of differential pump stages. Commercially available mass spectrometers use two or even three differential pump stages with the corresponding number of chambers upstream of the main chamber of the mass spectrometer. Three to four pumps are therefore used. The chambers are connected only by very small apertures and the ions are transported through these tiny apertures.

Where only two differential pump chambers are used in commercially available mass spectrometers, the pressure in the first differential chamber is usually a few millibar; in the second differential chamber the pressure falls to $10^{-3}$ to $10^{-1}$ millibar and does not drop to between $10^{-6}$ and $10^{-4}$ millibar until the main vacuum chamber. The mass spectrometer is located in the main vacuum chamber. The ions have to be transported through the differential pump chambers and through the tiny apertures between the chambers. During this process, there are considerable losses.

High-frequency multipole ion guides are often used to transport these ions through the chambers. The ion guides can only be used in the second differential pump chamber or in the main vacuum chamber because they are favorably used at a few $10^{-3}$ millibar, as they then rapidly dampen both radial oscillations and longitudinal movements and thereby provide relatively favorable conditions for further ion transport and analysis in the mass spectrometer.

The U.S. Pat. No. 5,818,055 (DE 196 28 179, Franzen) describes ion packaging in an n-phase travel field where the phases are applied sequentially to annular electrodes which are equally spaced along and concentric to the axis. According to this patent: "The travelling field can be produced within a package of coaxially arranged annular discs. An n-phase rotational RF voltage must be generated for this purpose and the phases connected cyclically in series to the annular discs. For example, if a 6-phase alternating voltage is generated, the first phase will then be connected to annular discs 1, 7, 13 and 19 etc. and the second phase will be connected to annular discs 2, 8, 14 and 20 etc. In this way, an electrical travelling field is created in a known way within the package of annular discs, and potentials of the same phases move along the axis of the package. When a potential minimum is filled with ions at the start of the package of annular discs, then this potential minimum moves along the axis of the package carrying the ions along with it. With this arrangement, the ions are initially accelerated until a velocity equilibrium has been established. Here, the damping gas can help damp the oscillations of the ions around an average velocity."

Since then, it has been found that, in this system, precisely when the ion package has acquired the velocity of the travelling field, radial focusing for the package is no longer possible. In flight, the ions are always in phase with the electrically attractive diaphragms which they pass flying, and therefore are defocused continuously by the attractive forces of these apertures. Radial focusing will only take place when each particle experiences a surrounding radially retroactive pseudo-potential, as already described in U.S. Pat. No. 5,572,035 (Franzen).

The use of ideal axis-focused packages (when they can be produced) for injection into an RF quadrupole ion trap has already been described in the patent mentioned, DE 196 28 179 or U.S. Pat. No. 5,818,055. However, it would also be possible to use ion packages such as these for injection into the cells of an ion cyclotron resonance mass spectrometer (often simply referred to as a Fourier-Transform mass spectrometer). These types of ion packages can also be used to advantage for time-of-flight mass spectrometers with orthogonal ion injection.

Time-of-flight mass spectrometers with orthogonal injection of the primary ion beam have a so-called pulser at the beginning of the flight path which, according to the technology used so far, accelerates a section of a continuous primary ion beam (i.e. a thread-shaped ion package) at right angles to the previous beam direction into the time-of-flight mass spectrometer. A ribbon-shaped secondary ion beam is formed at the same time in which light ions travel fast and heavy ions travel more slowly. The direction of flight of this beam is located between the previous direction of the primary ion beam and the direction of acceleration oriented at right angles to it (see FIG. 4). This type of time-of-flight mass spectrometer is preferably run with a velocity-focusing reflector which reflects the entire width of the ribbon-shaped secondary beam and guides it to a detector which is similarly widened. Just such a mass spectrometer with a gridless optical system is described in patent application DE 100 05 698.9 (Franzen).

The mass resolution of a time-of-flight mass spectrometer such as this essentially depends on the spatial and velocity distribution of the ions in the primary beam in the pulser. However, it also depends on the parallel adjustment of the pulser, reflector and detector since the slightest error in the parallel adjustment of the pulser, reflector or the detector results in operating time differences which are bound to lead to a reduction in the mass resolution. Apart from this, for sequential pulses, not all ions in the primary beam can be measured in the mass spectrometer since the pulser can only be filled according to either the heavier and slower or the lighter and faster ions.

A time-of-flight mass spectrometer with orthogonal ion injection is mainly operated with ion sources which produce large molecular ions from substances which are of biochemical interest. Ionisation is achieved by, for example, Matrix Assisted Laser Desorption and Ionization (MALDI) or by electron spraying of dissolved substances under atmospheric pressure outside the vacuum system (ESI=Electron Spray Ionization). In the latter case, the ions are introduced into the vacuum via input apertures or input capillaries and the accompanying gas (usually nitrogen) which is admitted with them is removed in several differential pump stages; see for example U.S. Pat. No. 6,011,259 (Whitehouse et al.).

Ions which are produced by MALDI, ESI or some other ionizer are injected into an ion guide system somewhere en route to the time-of-flight mass spectrometer, the principle of which is shown in FIG. 4. This can be carried out at an early stage in one of the differential pressure steps, in which case the ion guide system can pass through the walls between the differential pressure steps. However, this can also take place later in a special vacuum chamber, as shown in FIG. 4. During injection, the ions generally possess a certain kinetic energy of a few electron volts which they have mainly picked up from an electrical guide field and which is used to transport them into the ion guide system. The energy must not exceed approx. 2 to 8 electron volts if fragmentation of the ions by subsequent collision in the ion-guide system is to be avoided.

An RF ion-guide system is able to keep ions of moderate energy and not too small mass away from an imaginary cylinder wall of the ion-guide system (see also U.S. Pat. No. 5,572,035). The ions are injected, as it were, enclosed as in a pipe. This effect is achieved by using a so-called pseudo-potential field, a time-averaged force field which acts on the ions. (The pseudo-potential is mass dependent which, in this case, is only of marginal interest.) The pseudo-potential of all previously known ion guide systems has a trough at the axis of the ion guide system and increases towards the imaginary cylindrical wall. It reflects ions which approach the imaginary cylinder wall.

Time-of-flight mass spectrometers with orthogonal injection require the injected ion beam to be conditioned to an extremely high level. Here too, packaging the ions would be an advantage. Until now, the ion beams have been conditioned by using so-called ion guides which are filled with damping gas to dampen the axial movement of the ions. These gas-filled ion systems are also used for fragmenting selected "parent ions" by collisions with the damping gas. The ionized fragments of the parent ions are called "daughter ions".

External types of ionization such as electrospray often produce both singly charged ions and polycharged ions. Mass spectrometers only measure the so-called mass-to-charge ratio, i.e. the mass (usually expressed in atomic mass units) divided by the charge (usually expressed as the number of elementary charges). In the following, this mass-to-charge ratio will be referred to simply as the "specific mass."

SUMMARY OF THE INVENTION

The invention starts from a system of coaxial annular electrodes described in U.S. Pat. No. 5,572,035 where a series of annular electrodes are alternately connected to the two phases of an RF alternating voltage. When this system is filled with damping gas at a suitable pressure, axially injected ions are decelerated and then collected at the axis of the system. However, the system does not provide further propulsion for the ions. As described in the patent cited, such propulsion can be provided by, for example, a superimposed dc voltage to produce a fine, continuous ion beam of very small cross section.

In U.S. Pat. No. 5,818,055 (equivalent to DE 196 28 179), the idea was described to use an electrical travelling field on the system instead of the RF voltage, however, the ions are no longer focused in the axis as soon as the ions assume the speed of the travelling field.

To overcome this deficiency, in this invention two superimposed alternating voltages are applied to the annular electrodes: firstly an alternating two-phase RF voltage (for example, 40 V at 5 MHz) and secondly a multiphase low-frequency voltage (for example, 50 V at 50 kHz with six phases), forming a travelling field with an advancing rotational angle of the phases. The RF voltage provides the axial focusing and the low-frequency travelling field provides the packaging and transport of ion packets to the end of the system of annular diaphragms. Here, all ions of different specific masses are propelled at the same speed. In order to achieve superimposition with the two phases of the RF voltage, the number of rotational phases of the travelling-field voltage must be even. At least four, but preferably six, eight or more phases must be present. Preferredly, the phase angle between the phases should be equal. The condition of an even number of phases was not required in U.S. Pat. No. 5,818,055.

In an annular electrode system with aperture diameters of approximately six millimeters and where the electrodes are equally spaced at three millimeters, a six-phase travelling field at 50 kHz provides a travelling velocity for the ion packages of 900 meters per second. One ion package is ejected every 20 microseconds. The ion packages are spaced at 18 millimeters from each other.

At the axis of the apertured diaphragm system, the RF voltage is barely discernible. The low frequency travelling field voltage, on the other hand, is clearly present in the axis of the system although only with a fraction of the potential which the travelling field voltage produces at the diaphragms themselves. The potential wave depth drifting along the axis is dependent on the distance between the diaphragms and the aperture diameters of the annular diaphragms.

The injection of ions at low injection energy (to avoid fragmentation) into the more slowly moving waves of the travelling field voltage at the axis can be difficult. This can be helped by initially increasing the travelling field voltage at the start of the annular diaphragm system slowly by ramping the voltage amplitude maxima. However, this type of ramp is electronically difficult to create.

Nevertheless, an apertured diaphragm system can be made to have a similar effect to a voltage ramp. The spaces between the diaphragms in the apertured diaphragm system must be very small with a large aperture diameter at the beginning but, towards the end, the spaces must increase and the aperture diameters must decrease. The potential wave depth at the axis is then small at the beginning but increases towards the end. It is then easier to inject low-energy ions. Systems where only the spaces or the aperture diameters are varied are not so effective. An annular system in which the spaces between the annular diaphragms at the beginning are small but increase towards the end, accelerate the ion packages towards the end.

The ion packages can be injected, for example, into an RF quadrupole ion trap in phase, as described in DE 196 28 179. But they can also be injected into the pulser of a time-of-flight mass spectrometer where the time-of-flight mass spectrometer can be operated with an out-pulse frequency of, for example, 50 kHz. Here, because of the packaging, all the ions of an ion beam are used for the analysis. For this simple method of operation, the pulser need only be very short. However, the out-pulsed ions then spread out widely according to their specific masses since the deflection angles in the pulser are different for the different specific masses. A wide reflector and a much wider ion detector than those required for operation with a continuously injected, non-packaged ion beam are therefore still necessary.

However, a system can be set up which operates with a pulser of medium length, a relatively narrow reflector and a relatively short detector. The ion packages have to be subjected to lower post-acceleration so that the lightest ions will be faster than the heavier ions and will penetrate further into the pulser. However, the angle of deflection during out-pulsing is larger. It is therefore possible for the lighter ions to hit the detector at the same point as the heavy ions in the package. However, it is not possible to focus ions of all specific masses on one point of the detector, although the required length of the detector will be significantly smaller than for conventional operation.

The main advantages of these methods are as follows:

since all ions in the ion beam are used, the sensitivity is high;

since the ions of one specific mass always start from the same small site in the pulser and always hit the detector at the same spot, the mass resolution is largely insensitive to small maladjustments of the parallelity of the pulser, reflector and detector.

The damping-gas filled apertured diaphragm system according to the invention with axial focussed RF voltage and propelling travelling field can, in particular, also be used for fragmenting selected parent ion species. The parent ions can be selected in a mass spectrometer, such as a quadrupole filter, connected upstream. They are then injected into the apertured diaphragm system with an energy (e.g. acceleration at approx. 30 to 50 volts) which is sufficient for them to collide with the molecules of the damping gas and fragment. The pressure of the damping gas is raised high enough for the ions in the gas to be slowed to a standstill in the absence of a travelling field. However, the travelling field takes over all the remaining parent ions and newly formed daughter ions and guides them to the end of the apertured diaphragm system.

BRIEF DESCRIPTION OF THE DRAWINGS

In contrast to this.

DETAILED DESCRIPTION

The invention consists of damping the ions in a damping-gas filled series of apertured diaphragms (which are firstly subjected alternately to the two phases of an RF voltage and secondly to a multiphase low-frequency travelling field voltage) into the axis of the apertured diaphragm arrangement and packaging the ions in bundles which are propelled axially at the same velocity for ions of different specific masses. These ion packages, which are restricted both in an axial and a radial direction, can be used to advantage for injection into different types of mass spectrometer, both storage ion-trap mass spectrometers, such as cyclotron resonance mass spectrometers or quadrupole ion traps and, especially, for time-of-flight mass spectrometers with orthogonal injection. The arrangement of a damping-gas filled series of apertured diaphragms can also be used for ion fragmentation.

Figure 1:
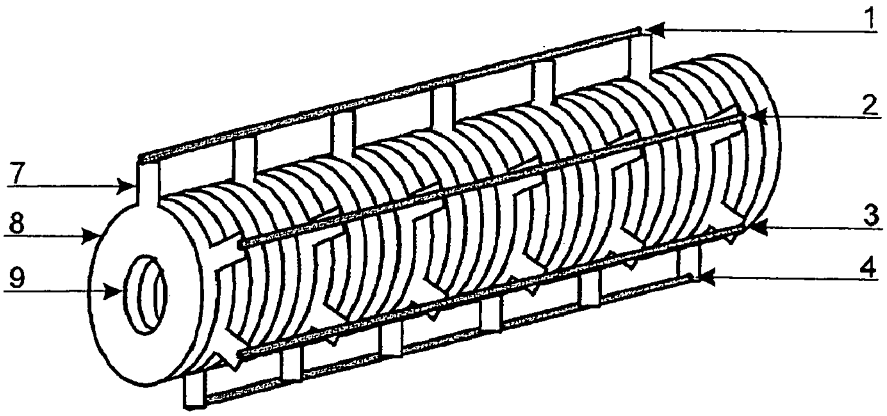
FIG. 1 shows a travelling field device according to the invention with apertured diaphragms (8) for a combined travelling field according to the invention with the superimposition of a 2-phase RF potential field and a 6-phase travelling field. The figure shows connections (1) for the first, (2) for the second, (3) for the third and (4) for the fourth phase of the six-phase rotational alternating voltage (the remaining connections are covered and are therefore not visible). The apertured diaphragms (8) have an inner aperture (9) and terminal tags (7) for the voltages.
Figure 2:
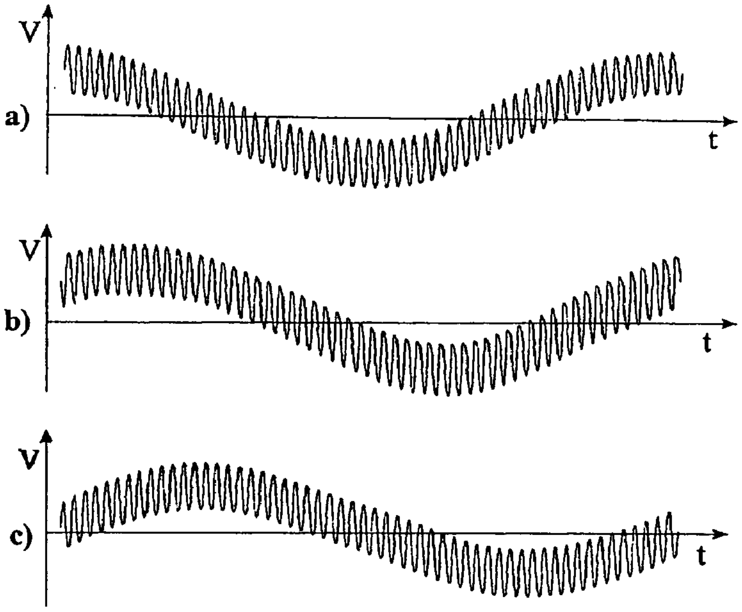
FIG. 2 shows the voltage superimposition V for the first three phases (a), (b) and (c) of a total of six phases for the combined travelling field as a function of time t. The propulsion of potential minima against time can be clearly seen. The combined travelling field consists of the superimposition of a two-phase RF voltage and a multiphase low-frequency alternating voltage.
Figure 3:
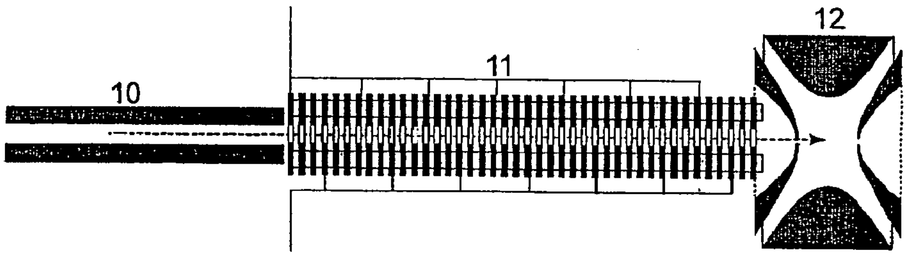
FIG. 3 shows the connection of the travelling field device (11) to an ion trap (12) with end caps and annular electrodes. The ions are injected from a quadrupole filter (10) connected upstream into the travelling field device. By using the quadrupole filter, it is possible to select suitable parent ions so that daughter ion spectra can also be produced by fragmenting the selected parent ions.

FIG. 1 shows a travelling field system consisting of coaxial annular electrodes. The two phases of an RF alternating voltage and also the travelling field (which in this case consists of six phases), superimposed over each other, can be connected to the annular electrodes or annular diaphragms. For this purpose, the superimposed voltages (of which the first three phases are shown in FIG. 2) must be applied to the terminal lugs. The RF voltage is then applied between each pair of successive annular diaphragms with opposite phases, whereas the travelling field is applied to six successive annular diaphragms in each case.

The RF voltage in the apertures of the annular diaphragms produces a series of small quadrupole ion traps (as described in U.S. Pat. No. 5,572,035), but the pseudo-potential saddles between the pseudo-potential wells in this case are small. At the axis of the travelling-field device, the RF alternating voltage is barely felt by the ions. Here, only the averaged potential of the travelling field can be felt, which, with its peristaltic-like longitudinal movement, carries the ions in its minima. If the ions are retarded slightly by a damping gas, then it is not the minimum but the leading edge of the potential which carries them along and propels them through the damping gas in a similar way to the potential difference which propels the ions through the gas in an ion mobility spectrometer.

According to the invention, this system is filled with damping gas at a suitable pressure. This retards all radial oscillations of the ions in the system and the ions assemble towards the axis of the system. However, the axial oscillations in the potential troughs of the RF quadrupole traps or of the travelling field are also slowed down, so that the movement of the ion packages is retarded and free of oscillation. The ion packages are of small volume and their cross section at right angles to the direction of flight is particularly small.

The most favorable voltages and frequencies for the RF voltage and travelling field voltage are dependent on the dimensions of the annular diaphragms and the pressure of the damping gas. The ions gather at the axis of the system. The frequency of the travelling field is usually determined from outside, by the requirements of the mass spectrometer, and this frequency determines the ejection of the ion package at the end of the travelling field device.

The two-phase RF voltage can be, for example, 45 volts at 5 MHz. The multiphase low frequency voltage for the travelling field can be, for example, 50 volts at 50 kHz and can have six phases. The RF voltage provides the axial focusing and the travelling field provides the packaging and transport of the ion packages to the end of the annular diaphragm system. In this system, the ions of different specific masses are carried forward at the same speed.

However, depending on the application, the voltages may vary considerably from the values given here. The RF voltage can be a few hundred volts at frequencies ranging from around 1 MHz to 10 MHz or more. The voltage for the travelling field can be anything from 5 to 300 volts.

In an annular electrode system with aperture diameters of approx. 6 millimeters and the electrodes spaced at 3 millimeters, a six-phase travelling field of 50 kHz produces a velocity of the ion packages of 900 meters per second. An eight-phase travelling field would produce a velocity of 1200 meters per second. One ion package is ejected every 20 microseconds. In a six-phase travelling field, the ion packages are spaced at 18 millimeters. In an eight-phase travelling field the spacing is 24 millimeters. The minimum requirements for a travelling field are a four-phase travelling field voltage and an even number of phases.

The RF voltage at the axis of the apertured diaphragm system is barely detectable; only slight pseudo-potential waves are present. On the other hand, the low-frequency travelling field voltage, where the voltage periods extend over several apertured diaphragms, is clearly present but amounts only to a fraction of the potential amplitude applied by the travelling field voltage generator to the diaphragms. The potential amplitude in the axis is dependent on the distances of the diaphragms from each other and the diameters of the apertures in the annular diaphragms. For example, the voltage amplitude in a diaphragm system where the distance between the diaphragms is 3 millimeters and the apertures diameters are 6 millimeters, only amounts to about a quarter of the voltage amplitude at the diaphragms themselves.

It can be difficult to inject ions with rather low injection energy (to avoid fragmentation) into the potential waves which travel at much lower speed in the axis. This can be remedied by ramping up the voltage amplitude from the entrance towards the exit, but this type of ramp is difficult to produce electronically.

By extending the apertured diaphragm system, it is possible to create an effect similar to that of a voltage ramp. At the beginning of the system, the distances between the apertured diaphragms must be small and the apertures in the diaphragms must be large, but the distances should increase and the apertures decrease towards the end of the system. Furthermore, if at the entrance of the system there is a diaphragm at an average axis potential, i.e. with no alternating voltage potential, then a ramp-type decrease in the ripple is again produced by extending into the diaphragm system. The potential amplitude at the axis is then small at the beginning but increases towards the end. Low energy ions, i.e. those ions which should not be fragmented in the travelling field system, can be injected without being immediately reflected by an opposing potential wall. Systems where only the distances between the diaphragms or only the aperture diameters are varied are not quite so effective.

An annular diaphragm system where the distances between the annular diaphragms are small at the beginning but increase towards the end propels the ion packages towards the end.

As described in DE 196 28 179, the ion packages can be injected into an RF quadrupole ion trap in phase to produce a very high capture rate in the ion trap. This mode of operation will not be covered in any more detail here. The ion packages can also be injected into the cells of ion cyclotron resonance mass spectrometers (ICR spectrometers or Fourier-transform mass spectrometers, FTMS for short). In this case it is particularly favorable for the ions of all specific masses in the ion package to have the same velocity.

Figure 4:
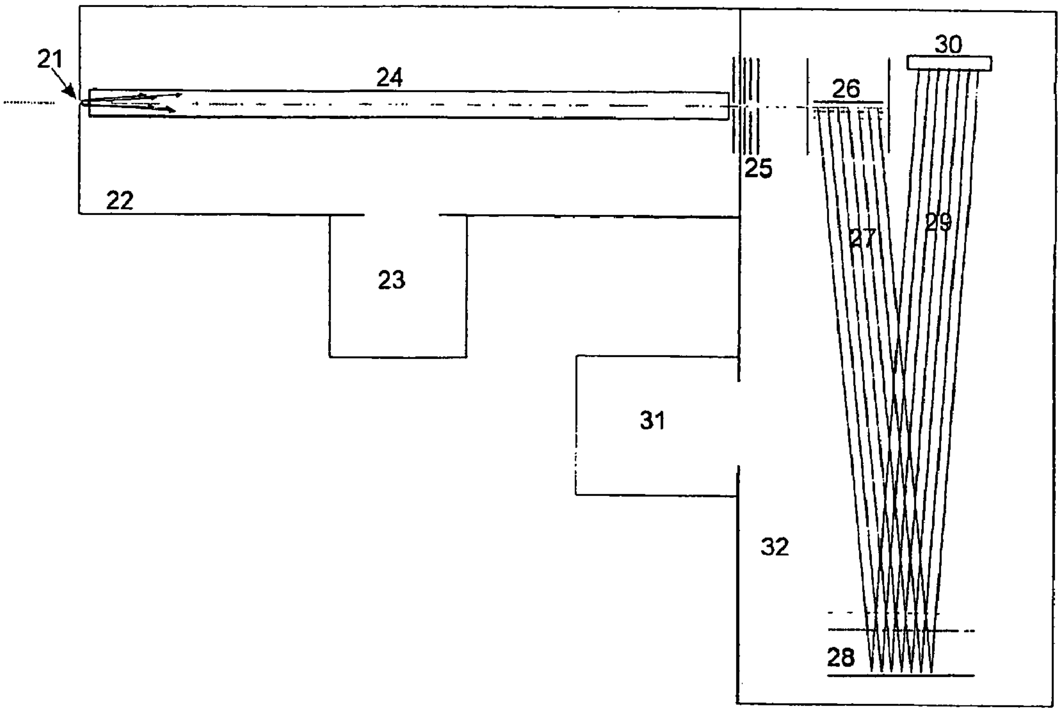
FIG. 4 shows the previous mode of operation for a time-of-flight mass spectrometer with orthogonal injection. The ions are injected via a small aperture (21) into the vacuum chamber (22) which is pumped by pump (23). In this case, they are accepted by an ion guide device (24). The acceleration lens (25) then injects them continuously into a pulser (26) which periodically pulses them out as a wide ion ribbon. The ion ribbon (27) is reflected by the reflector (28) and the reflected ion ribbon (29) is measured at the detector (30). The time-of-flight mass spectrometer with pulser (26), reflector (28) and detector (30) is located in its own vacuum chamber (32) which is pumped by the pump (31). Light and heavy ions are distributed evenly via the pulser and after outpulsing form a wide ion ribbon beam (27) which is reflected by the reflector as a ribbon beam (29) with a wide front and detected by the detector (30). To avoid differences in operating time, the pulser, reflector and detector must be adjusted strictly in parallel with each other.
Figure 5:
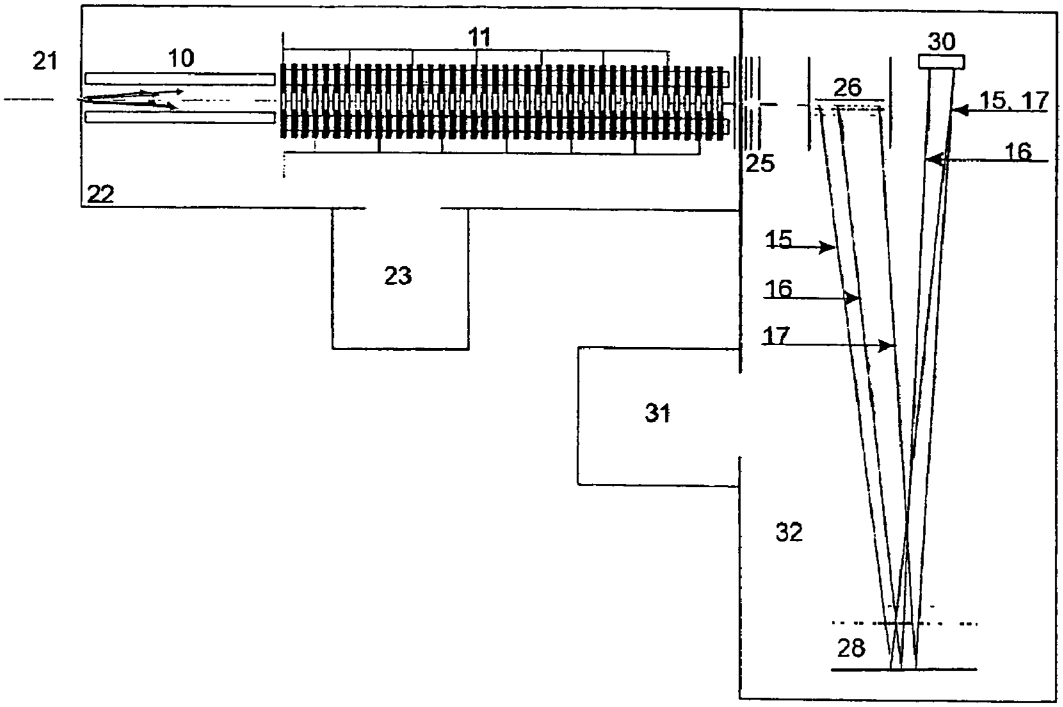
FIG. 5 shows the mode of operation with ions from a quadrupole filter (10) packaged in a travelling field device (11) according to the invention. Ions of one specific mass always start at the same place in the pulser (26) and always arrive at the detector (30) at the same place. With slight post-acceleration of the packages in the acceleration lens (25), it is possible to measure light ions of a specific mass m/e=125 atomic mass units per elementary charge (17) and heavy ions of m/e=4000 (15) at the same place on the detector but medium heavy ions of m/e=1000 (16) deviate from this point. It is advantageous for the detector (30) to be shorter than that for the previous mode of operation shown in FIG. 4. The need for adjustment precision is diminished.

However, as shown in FIG. 5, the ion packages can also be injected into the pulser of a time-of-flight mass spectrometer where, for example, the time-of-flight mass spectrometer operates with an out-pulse frequency which is the same as the travelling field frequency, i.e. 50 kHz for example. The advantage of this method is that all ions from every ion beam are made available for analysis, which is not the case with conventional methods (FIG. 4).

Without post-accelerating the ion packages, the pulser for this mode of operation can be very short. However, the out-pulsed ions then spread out in accordance with their specific mass since the angle of deflection in the pulser is different for the different specific masses. The angle of deflection is $\tan \alpha = v_0/v_1 = v_0/\sqrt{(2eE/m)}$, where $v_0$ is the common velocity for all specific masses, $v_1$ is the velocity of ions of mass m and charge e after pulsing in the vertical direction to energy E. The angle is dependent on the specific mass m/e. A wide reflector and a much wider ion detector than is required for operation with a continuously injected, non-packaged ion beam where the angle of deflection is the same for ions of all specific masses are still necessary.

Nevertheless, it is still possible to produce a form of operation which uses a relatively short pulser, a relatively narrow reflector and a relatively short detector. To this end, the ion packages are subjected to slight post acceleration of, e.g., 9 volts for the case in FIG. 5. As shown in FIG. 5, the lightest ions now travel faster than the heavier ions and penetrate further into the pulser before out-pulsing takes place. The angle of deflection for the light ions is greater than the angle of deflection for the heavier ions. It is therefore possible for the lightest ions to hit the detector at the same place as the heaviest ions in the ion package. Thus, ions of specific masses of m/e=125 and m/e=4000 atomic mass units can be detected on the detector at the same place but ions with medium specific masses of m/e=1000 arrive at a different place, though not far away. It is not possible to focus ions of all specific masses on a single point on the detector, but the required length of the detector is much smaller.

For ion packages with a velocity of v.sub.0=1200 meters per second, it is now possible for a pulser which is 35 millimeters long to accelerate all ions in the range of specific masses m/e=125 to m/e=4000 atomic mass units per elementary charge and these ions can be detected by a detector which is only 20 millimeters long.

The apertured diaphragm filled with damping gas according to the invention with axially focusing RF voltage and travelling field can also be used particularly for fragmenting selected parent ion species. The parent ions can be selected using a mass spectrometer such as a quadrupole filter connected upstream, as shown in FIG. 5. For this purpose, they are injected into the apertured diaphragm system with an energy of, for example, approximately 30 to 50 volts, which is sufficient to fragment the ions by collision with the molecules of the damping gas. In this case, the pressure of the damping gas is raised so high that the ions would be slowed down to standstill in the gas if the travelling field were not present. However, the travelling field takes over the remaining parent and newly formed daughter ions and guides them to the end of the apertured diaphragm system.

It is thus particularly important for the length of the travel field system and the pressure of the damping gas to be tuned to each other so that the ions which have been injected stop moving in the gas altogether—except for movement due to thermal diffusion—and therefore gather at the axis of the ion guide system.

It is possible to fill the system with gas by operating the travelling field system in a vacuum chamber which is at the desired pressure between 0.01 and 100 Pascal (preferably between 0.1 and 10 Pascal) or by at least partially enveloping the travelling field system so that only the envelope is filled with gas. The gas can flow out at the ends of the travelling field system, but the envelope can also stop a few diaphragms before the ends of the system to provide a gradual transition in the pressure towards vacuum.

The ion packages can be drawn out of the travelling field through a drawing lens and accelerated further. A drawing lens is an ion-optical lens which both focuses (or defocuses) and accelerates the ions simultaneously. The potentials on either side of the lens are therefore different. This is in contrast to a so-called Einzel-lens which only has focusing (or defocusing) properties but no acceleration effect; the Einzel-lens is at the same potential on both sides. Drawing lenses and Einzel-lenses usually consist of concentric apertured diaphragms at a fixed distance from each other. A drawing lens system is a system of ion-optical lenses containing at least one drawing lens. With this system, an originating location with a small area can display ions of uniform energy in a still smaller image location (in the ion focus) or convert the ions into a almost parallel beam of small cross section.

A drawing lens can draw the ions from the travelling field system particularly well when the potential of the second apertured diaphragm extends through the aperture of the first apertured diaphragm into the travelling field system while the potential of the first apertured diaphragm is approximately at the axis potential of the travelling field system. It is also advantageous for the aperture of the second apertured diaphragm to be smaller in diameter than the aperture of the first apertured diaphragm. And it is advantageous to use the three last diaphragms of the drawing lens system as an Einzel-lens to take over the required focusing.

Since a gas pressure is required to retard the movement of ions in the travelling field system according to the invention but a very good vacuum must be present in the time-of-flight mass spectrometer, these environments must be housed in separate chambers, as shown in FIG. 5. It is then expedient to integrate the apertured diaphragm of the drawing lens system with the smallest aperture gas-tight into the wall between the two chambers. The aperture diameter can be approximately 0.5 millimeters. In order to maintain a good pressure difference it is helpful if the aperture is in the form of a small channel. Two apertured diaphragms of the drawing lens system can also be used to produce a differential pump stage by pumping out separately between these two apertured diaphragms.

If the damping-gas pressure in the travelling field system decreases towards the end this also helps to maintain a good pressure in the time-of-flight mass spectrometer. This can be achieved by creating a pressure drop towards the end of the travelling field system via the apertures in the envelope.

In particular, the travelling field system can also be used for fragmenting injected ions for scanning daughter-ion spectra. The ions must be injected with a kinetic energy which is sufficient for fragmentation by collision. In this case, to obtain a good yield and for subsequent conditioning of fragmented ions, it is particularly important to slow the ions down in the collision gas to the travelling field velocity. The relatively slow guidance of the ions to the end of the ion guide system also helps to cool the daughter ions and bring short-lived, highly excited daughter ions to decomposition. In the time-of-flight mass spectrometer, this produces an essentially background-free daughter-ion spectrum which is not contaminated by scattered ions which are produced by the ion decomposition during flight in the time-of-flight mass spectrometer.

To obtain clean daughter-ion spectra which are free of companion ions, it is expedient to clean the selected parent ions of all other companion ions. This is called "ion selection" and usually takes place in a mass spectrometer which is connected upstream. Any continuously filtering mass spectrometer such as a magnet sector field mass spectrometer can be used for this purpose. However, linear mass spectrometers such as a quadrupole filters (see FIG. 5) or Wien filters are particularly suitable. In a Wien filter, a magnetic field is superimposed on an electrical field to make the selected ions fly straight; their magnetic deflection is just compensated for by the electrical deflection. Using one mass spectrometer to select the ions, a collision cell for fragmentation and a second mass spectrometer to analyze the daughter ions and fragment ions is called "Tandem mass spectrometry" or "MS/MS".

The parent ions used for generating the daughter ions can be selected in various ways. It is possible to select all the isotope ions of a substance with the same charge or only a single isotopic species ("monoisotopic ions").

Now the travelling field system according to the invention is filled with enough damping gas to reduce the velocity of the ions injected into the gas to the velocity of the travelling field. For this purpose, a pressure between 0.01 and 10 Pascal is needed, depending on the length of the travelling field system. The gas pressure which is usually most favorable is between 0.1 and 1 Pascal. The most favorable pressure is determined experimentally. Helium can be used as the damping gas but the nitrogen from the gaseous environment of the electron spray device which enters the vacuum system with the ions has also been found to be useable. If the ions which are introduced have to be fragmented, then heavier gases such as argon have also proved worth using, in some cases mixed with lighter gases. The damping gas can be introduced to the vacuum chamber via its own gas feed but it can also flow through an aperture from a differential pump chamber upstream. In this case, it is advantageous to surround the travelling field system with a tight envelope which takes up the damping gas. In that case, it will not be necessary to flood the whole vacuum chamber with gas.

Any travelling field system according to the invention is capable of collecting and guiding only those ions which are above a specified mass-to-charge ratio. Lighter ions escape from the system. The expression used for this is the lower mass limit of the system and is dependent on the geometry of the travelling field system and the frequency and amplitude of the RF voltage. This limit is generally unimportant for the analysis of larger ions of substances of biochemical interest.

An upper mass limit can be easily produced via the upstream quadrupole filter. An upper mass limit is advantageous for a time-of-flight mass spectrometer if a very high spectral scanning rate is to be maintained. In that case, no ghost peaks originating from very heavy and therefore very slow ions from the previous cycle of the spectral scan appear in the spectrum which follows.

When the ions have been guided to the end of the travelling field system, they are drawn out through a drawing lens system. A drawing lens system is an ion-optical aid used to display the ions from a flat originating location on a similarly flat image location while accelerating the ions at the same time. If the ions from the originating location have very uniform energies, then an image location can be produced which is smaller than the originating location.

By using a drawing lens system, the ions which are in the form of packages with thermal energies alone and located at the axis of the travelling field system can be shaped excellently into an extremely fine primary ion beam directed into the pulser of the time-of-flight mass spectrometer. An adjustable voltage is also used to accelerate the ions in the small volume ion packages to an additional kinetic energy which is suitable for the pulser. The additional energies range between approx. 3 and 30 electron volts, depending on the length of the pulser and the scanning cycle period. The best method for adjusting the ion beam which is produced depends on the properties of the time-of-flight mass spectrometer and can be easily determined experimentally.

When the pulser is full, a high acceleration field is rapidly switched on (within a few nanoseconds) and this accelerates the ions out of the pulser at right angles to their previous direction as a broad ion package. The acceleration field can be created by switching on a voltage at one of the two diaphragms (or at both at the same time) through which the primary beam is passing. After the ions have left, the voltage must be switched off again so that the pulser can admit the ions of the next ion package. A relatively short voltage pulse is applied—hence the name "pulser".

The ions which have been pulsed out now fly to the reflector at an angle between the direction of the primary ion beam and the direction of acceleration. The angle is dependent on the specific mass of the ions. The ions are reflected at the reflector and then fly to the ion detector, where the periodically alternating stream indicates the flight times of the ions of different specific masses (the same as the mass-to-charge ratio). A favorable embodiment is shown in FIG. 5.

Naturally, there must be a good vacuum in the time-of-flight mass spectrometer in order to prevent collision between the ions and the residual gas and to avoid the resulting scattered ions which would generate background noise in the spectrum. On the other hand, in the travelling field system a gas pressure is deliberately maintained to produce a very high collision rate. The spectrometer and the travelling field system must therefore be housed in different vacuum chambers which contain different levels of vacuum. As a consequence, the passage of ions between the two chambers cannot have a good conductance for the cross section of gases. It is therefore expedient to use the drawing lens with the smallest aperture as the only connection between the chambers and to integrate the diaphragm into the wall between the two chambers gas-tight. This diaphragm can be also be formed as a small channel which reduces the conductance still further. This arrangement is sufficient for a high performance vacuum pump connected to the spectrometer. If a smaller pump has to be used for economic reasons, it is better to pump the drawing lens system between two suitable diaphragms, i.e. to choose a differential pump arrangement.

Furthermore, to maintain a good pressure inside the time-of-flight mass spectrometer it is helpful if the pressure of the damping gas in the travelling field system decreases towards the end. This can be achieved if, at the start, the gas flows into the enveloped travelling field system and if a drop in pressure is produced along the travelling field system by apertures in the envelope so that a high gas density does not occur at the apertured diaphragm leading to the spectrometer chamber.

The time-of-flight mass spectrometer can be operated at very high cycle rates such as 50,000 scans per second from which a very large number of individual spectra can usually be added together after digitization to produce sum spectra. The advantage of this is that the time-of-flight mass spectrometer can be enabled to deliver very high mass precision. On the other hand, when a fast-acting separation system is connected upstream, high substance resolution can be achieved by generating 10 to 20 (or even more) sum spectra per second. The ion source for this mass spectrometer can therefore be coupled to very rapid separation systems, such as capillary electrophoresis or micro-column liquid chromatography. These sample separators then deliver time-delayed ranges of very concentrated substances for short periods. These substances are well resolved against time for the time-of-flight mass spectrometer by conditioning the primary beam according to the invention.

What is claimed is:

1. A mass spectrometer comprising:

an ion source for producing ions;

a pulser;

a mass analyzer; and a traveling field device for transporting ions along a path from said ion source to said, mass analyzer, said device having a traveling field voltage applied to at least a part of said device.

2. A mass spectrometer according to claim 1, wherein said device comprises a plurality of coaxial apertured diaphragms.

3. A mass spectrometer according to claim 2, wherein at a first end of said device a distance between each of said apertured diaphragms is smaller than at a second end of said device.

4. A mass spectrometer according to claim 2, wherein at a first end of said device a size of apertures of said apertured diaphragms is smaller than at a second end of said device.

5. A mass spectrometer according to claim 1, wherein said traveling field voltage has an even number of rotational phases having equal angle of rotation spacings.

6. A mass spectrometer according to claim 1, wherein an RF voltage is superimposed over said traveling field voltage.

7. A mass spectrometer according to claim 1, wherein said RF voltage is a two-phase RF voltage.

8. A mass spectrometer according to claim 1, wherein a damping gas is provided in said traveling field device to reduce oscillations of said ions in said device.

9. A mass spectrometer according to claim 1, wherein said traveling field device is capable of trapping said ions for a predetermined length of time.

10. A mass spectrometer according to claim 1, wherein said traveling field voltage comprises four, six or eight phases.

11. A mass spectrometer comprising:

an ion source for producing sample ions;

a filter for receiving said sample ions from said ion source and selecting certain of said sample ions;

a traveling field device comprising a plurality of coaxial diaphragms; and an analyzer including a detector for detecting said sample ions;

a pulser for packaaing said selected ions;

wherein a traveling field voltage and a superimposed two-phase RF voltage are applied along said diaphragms, and wherein said traveling field device transports said selected ions from said filter to said analyzer.

12. A mass spectrometer according to claim 11, wherein said mass spectrometer further comprises an ion reflector for reflecting ions received from said pulser onto a path toward said deflector.

13. A mass spectrometer according to claim 11, wherein said selected ions are continuously injected into said pulser.

14. A mass spectrometer according to claim 11, wherein said mass spectrometer is capable of trapping said ions for a predetermined length of time.

15. A mass spectrometer comprising:

a traveling field ion guide having a plurality of coaxial apertured diaphragms with a first alternating voltage alternately superimposed over a second alternating voltage; and a pulser.

16. A mass spectrometer according to claim 15, wherein said first alternating voltage is a two-phase RF voltage.

17. A mass spectrometer according to claim 15, wherein said second alternating voltage is a multiphase low-frequency voltage.

18. A mass spectrometer according to claim 15, wherein a voltage generator provides sequential rotational phases of said second voltage to said apertured diaphragms.

19. A mass spectrometer according to claim 15, wherein said second voltage comprises rotary phases having an equal angle of rotation spacings.

* * * * *